United States Patent [19]
Worster

[11] Patent Number: 5,418,777
[45] Date of Patent: May 23, 1995

[54] MODIFIED LEAKY BUCKET METHOD

[75] Inventor: Thomas Worster, Munich, Germany

[73] Assignee: Siemens Aktiengesellschaft, Munich, Germany

[21] Appl. No.: 82,362

[22] Filed: Jun. 28, 1993

[30] Foreign Application Priority Data

Jun. 30, 1992 [EP] European Pat. Off. ............ 92306050

[51] Int. Cl.⁶ .............................................. H04J 3/14
[52] U.S. Cl. ........................................ 370/17; 370/60; 370/94.1
[58] Field of Search ............... 370/13, 17, 60, 60.1, 370/94.1, 84, 94.2; 340/825.5, 825.51

[56] References Cited

U.S. PATENT DOCUMENTS

| | | | |
|---|---|---|---|
| 4,896,316 | 1/1990 | Lespagnol et al. | 370/60 |
| 5,007,043 | 4/1991 | Van Den Dool et al. | 370/60 |
| 5,007,048 | 4/1991 | Kowalk | 370/60 |
| 5,014,260 | 5/1991 | Wicklund | 370/13 |
| 5,117,417 | 5/1992 | Danner | 370/13 |
| 5,132,961 | 7/1992 | Thiebaut et al. | 370/94.1 |
| 5,140,588 | 8/1992 | Danner | 370/94.1 |
| 5,233,601 | 8/1993 | Boyer et al. | 370/17 |
| 5,276,676 | 1/1994 | Horn et al. | 370/17 |

FOREIGN PATENT DOCUMENTS 0381275 8/1990 European Pat. Off. .
0419958 4/1991 European Pat. Off. .

OTHER PUBLICATIONS

A. E. Eckberg, et al., "Bandwich Management: A Congestion Control Strategy for Broadband Packet Networks—Characterizing the Throughput-burstiness Filter", Computer Networks and ISDN Systems, Bd. 20 (Dec. 1990) No. 1/5.

Jonathan S. Turner, "New Directions in Communication", International Zurich Seminar on Digital Communications (Mar. 1986) A3.1 . . . A3.8.

Primary Examiner—Douglas W. Olms
Assistant Examiner—Chau T. Nguyen
Attorney, Agent, or Firm—Hill, Steadman & Simpson

[57] ABSTRACT

A modified leaky-bucket method for a message transmission system wherein a message cell stream is asynchronously transmitted, this message cell stream carrying message cells for a plurality of virtual connections with a broad range of possible message cell rates, the message cell rate for every virtual connection is being monitored and limited according to a leaky-bucket method, the shortest allowable, timing between two message cells belonging to the same virtual connection being represented by the quotient of two numbers.

5 Claims, 1 Drawing Sheet

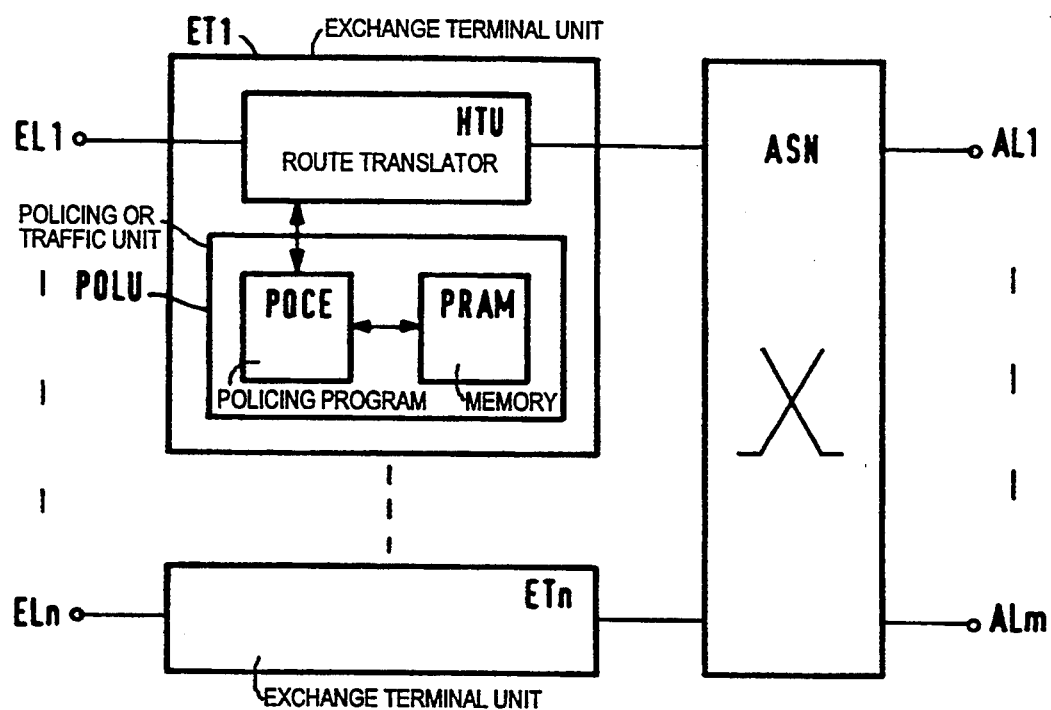

MODIFIED LEAKY BUCKET METHOD

BACKGROUND OF THE INVENTION

The invention is directed generally to broad band switching systems. More specifically, the invention is directed to leaky bucket methods for packet switching systems wherein the binary character rate for every virtual connection is monitored and limited in a message cell stream that is transmitted according to an asynchronous transfer mode or method (ATM) and that carries message cells of a plurality of virtual connections having a defined plurality of binary characters.

It is known in broad band switching systems, wherein information packeted in message cells is asynchronously transmitted over virtual connections to declare a maximum binary character rate, among other things, when setting up a respective, virtual connection between the appertaining subscriber location and the broad band switching system. In order to avoid overload phenomena, the binary character rate for every virtual connection must be monitored and, potentially, limited at the access locations of the broad band switching system or at the exchange terminating equipment of the switching nodes of the broad band switching system. Equipment for monitoring and limiting binary character rates are generally referred to as policing equipment.

It also is known (e.g., from "New Directions in Communications" A...1–A...8 by J. B. Turner, in "International Zurich Seminar on Digital Communication", March 1986, fully incorporated herein by reference) to allocate a forward-backward (up/down) counter in a switching node of a broad band switching system to every subscriber location connected to this switching node, this forward-backward counter counting the message cells transmitted by the respective subscriber location and lowering the momentary counter reading at defined points in time in accordance with the binary character rate declared by the respective subscriber location. When the momentary counter reading exceeds a value prescribed by the respective subscriber location, then the switching node recognizes an overload. This is known as the "leaky bucket method".

In such a leaky bucket method, it is not necessary to recalculate for every virtual connection the counter readings of all established virtual connections during every message cell cycle wherein a message cell can arrive at the same time as the arrival time of the most recent message cell belonging to the connection is stored; and the counter reading of the connection to which a message cell belongs is only recalculated given the arrival of this message cell. The current counter reading $z_{na}$ for a virtual connection n is thereby calculated according to the expression $$z_{na} = z_{na-1} \infty \frac{t - t_{1n}}{t_{dn}} + 1$$

whereby $z_{na-1}$ is the counter reading for the virtual connection n before the arrival of the message cell now under consideration d is the current point in time $t_{1n}$ is the point in time of the arrival of the immediately preceding message cell belonging to the same virtual connection $t_{dn}$ is the shortest allowable chronological spacing of two successive message cells belonging to the virtual connection under consideration.

When a broad range of, for example, five orders of magnitude, of binary character rates is monitored in this way, then the numerical values to be processed exhibit a correspondingly great value range, this requiring a correspondingly great capacity of the memory in which the values are stored. Over and above this, a processing of numerical values having a great value range and the necessity of implementing floating decimal point operations is opposed by a reduction of the time requirement for the processing.

SUMMARY OF THE INVENTION

The invention provides a method that overcomes the above stated disadvantages to be avoided.

In an embodiment, the invention provides a method for monitoring and limiting the binary character rate of a virtual connection in a communications system, comprising the steps of:

asynchronously transmitting message cells belonging to a plurality of virtual connections, every message cell comprising a known plurality of binary characters;

establishing a binary character rate $B_{req}$ for every virtual connection; maintaining a counter reading for every virtual connection; calculating a current counter reading according to the expression $$z_{na} = z_{na-1} \infty \frac{t - t_{1n}}{t_{dn}} + 1$$

upon arrival of a message cell for the virtual connection n to which this message cell belongs, whereby $z_{na}$ indicates the current counter reading for the virtual connection n $z_{na-1}$ indicates the counter reading for the virtual connection n before the arrival of the message cell now under consideration t indicates the current point in time $t_{1n}$ indicates the point in time of the arrival of the immediately preceding message cell belonging to the same virtual connection $t_{dn}$ indicates the shortest, allowable chronological spacing between two successive message cells belonging to the virtual connection under consideration;

discarding the message cell under consideration when a defined counter reading is exceeded by the current counter reading; and otherwise forwarding the message cell now under consideration, whereby two memory locations are provided for storing the shortest allowable timing between two message cells belonging to the same virtual connection, a multiple of the shortest allowable timing being stored in one of said two memory locations and a quotient of this multiple and the shortest allowable timing itself being stored in the other of said memory locations, and whereby a quotient of the contents of both memory locations is formed in the calculation of the current counter reading for the generation of the shortest allowable timing.

Advantageously, the invention enables, first, a considerable reduction of the total memory capacity required for every virtual connection and, second, enables an improved adaptability to the respectively monitored binary character rate.

These and other advantages and features of the invention are set forth below in the following detailed description of the presently preferred embodiments with reference to the accompanying drawing.

BRIEF DESCRIPTION OF THE DRAWING

The sole FIGURE illustrates a circuit block diagram of a broad band switching network in which the method of the invention can be implemented.

DETAILED DESCRIPTION OF THE PRESENTLY PREFERRED EMBODIMENTS

The FIGURE illustrates a broad band switching network that is capable of selectively forwarding message cells arriving asynchronously in message cell streams on input lines EL1 ... ELn onto output lines AL1 ... ALn, during the course of virtual connections. The message cells can belong, e.g., to a plurality of virtual connections and each can respectively comprise a defined plurality of binary characters. Further, every message cell can comprise a useful data part and a message cell header part preceding the useful data part, the message cell header identifying the virtual connection to which the respective message cell belongs.

A message cell incoming on an input line is first supplied to an exchange termination equipment or unit ET1 ... ETn that is individually associated with an input line. A message cell just incoming is intermediately stored in a route interpreter or translator HTU contained in the exchange terminating equipment. The original destination information likewise contained in the message cell header is replaced in the route interpreter HTU by new destination information in a known way based on a measure of the appertaining, virtual connection. Information indicting the appertaining virtual connection then is forwarded to a policing equipment or unit POLU for every message cell.

The binary character rate declared for every virtual connection during the course of the call set up is monitored on the basis of the message cell rate and potentially is limited in the policing equipment. A counter reading is kept in the policing equipment POLU for every virtual connection just set up. At every arrival of a message cell, a current counter reading is calculated for the virtual connection to which this message cell belongs, the current counter reading being calculated according to the expression $$z_{na} = z_{na-1} \infty \frac{t - t_{ln}}{t_{dn}} + 1,$$

wherein
- $z_{na}$ is the current counter reading for the virtual connection n,
- $z_{na-1}$ is the counter reading immediately before the arrival of the message cell just under consideration,
- t is the current point in time,
- $t_{ln}$ denotes the point in time of the arrival of the message cell belonging to the same virtual connection that immediately precedes the message cell just under consideration,
- $t_{dn}$ is the shortest allowable, timing or chronological spacing between two successive message cells belonging to this virtual connection according to the binary character rate established for the virtual connection under consideration.

The current occupancy of the connection corresponds to the occupancy of what is referred to as a "leaky bucket". For calculating the current occupancy, the counter reading calculated at the arrival of the preceding message cell, the point in time of the arrival of the preceding message cell and the shortest allowable, chronological spacing between two successive message cells according to the binary character rate established during the course of the set up of the virtual connection under consideration are stored in a memory PRAM for every virtual connection. At every arrival of a message cell, these values are transferred from the memory PRAM into a policing execution means POCE (e.g., a program and processor) and a current counter reading is calculated therein. When the current counter reading calculated for a message cell which has just arrived exceeds a defined, maximum counter reading, then this message cell is discarded, whereby the counter reading calculated for the preceding message cell and the point in time of the arrival of the preceding message cell are again written into the memory PRAM. When the current counter reading calculated for a message cell that has just arrived does not exceed the defined maximum counter reading, then this message cell is forwarded and the current counter reading calculated for this message cell as well as the point in time of the arrival of this message cell are written into the memory PRAM.

For every incoming message cell, thus, a read and write operation in the memory PRAM and an arithmetic operation in the policing execution means POCE are undertaken. And, the time required for monitoring these events increases, first, with the length of the numerical values to be processed and, second, when floating operations must be carried out.

It is then inventively provided that the shortest timing or chronological spacing $t_d$ between two successive message cells that belong to the same virtual connection is determined by the quotient of two numbers, whereby the relationship $$t_d = \frac{X}{Y}$$

is established. The equation set forth above is thus given the following formula:

$$z_{na} = z_{na-1} - \frac{Y}{X}(t - t_{na}) + 1$$

By multiplying the entire equation by the value X, the equation becomes the following:

$$z_{na} \cdot X = z_{na-1} \cdot X - Y(t - t_{an}) + X$$

A floating decimal point presentation of the expression $z_{na} \cdot X$ that now represents the current counter reading is avoided by a suitable selection of the value X.

For example, let the monitored binary character rate $B_{pol}$ be higher than the respective binary character rate $B_{req}$ established for a virtual connection by a prescribed safety factor $f_s$ that, for example, amounts to one percent. Possible instabilities of the leaky bucket method are counteracted by taking a safety factor into consideration. The monitored binary character rate thus is $B_{Pol} = B_{req} \cdot (1 + f_s)$.

When the useful data rate of the message cell stream or, respectively, of the transmission system is established as NB and a fixed value is prescribed for the number Y, then the number X derived is:

$$X = \frac{Y \cdot NB}{f_s \cdot B_{req}}$$

whereby the value of X is rounded to the closest, whole-number value.

It can be necessary in a policing unit to monitor virtual connections having a broad range of binary character rates, for example between 2.4 kbit/s and 120 Mbit/s. This broad range, which covers five orders of magnitude in the exemplary embodiment, yields a great value range and, thus, a broad range of dynamics of the value that indicates the shortest allowable timing or chronological spacing between two successive message cells belonging to the same virtual connection. The measure of the invention, in accordance with which the value that corresponds to the shortest, timing or chronological spacing between two successive message cells belonging to the same virtual connection is expressed by two numerical values that are multiplicatively in relationship to one another, enables, first, an adequate granularity of the policeable binary character rates given a suitable selection and definition of the one numerical value and, second, enables a considerable reduction of the value range of the other numerical value.

The deviation err of the respective, policed binary character rate derives from $$err = \frac{B_{pol} - B_{req}}{B_{req}} = \frac{Y \cdot NB - X \cdot B_{req}}{X \cdot B_{req}}$$

whereby the deviation err should be of the same size as the safety factor $f_s$.

As an example, the method of the invention be considered in greater detail with reference to a transmission system having a gross data rate of 155 Mbit/s and a useful data rate NB of 135 Mbit/s for different values of the number Y.

When the number Y for all binary character rates from 2.4 kbit/s through 120 Mbit/s to be monitored is set, for example, to the value 16, then the values of the number X set forth below are obtained for the binary character rates $B_{req}$ set forth below and the deviation err in percentages deriving therefrom.

| $B_{req}$ | X | Y | % err |
|---|---|---|---|
| 2.4 | 895259 | 16 | 1.000 |
| 16.0 | 134290 | 16 | 1.000 |
| 64.0 | 33572 | 16 | 1.001 |
| 144.0 | 14921 | 16 | 1.000 |
| 1,920.0 | 1119 | 16 | 1.007 |
| 10,000.0 | 215 | 16 | 0.935 |
| 34,368.0 | 63 | 16 | 0.227 |
| 68,736.0 | 31 | 16 | 1.844 |
| 120,000.0 | 18 | 16 | 0.468 |

Per virtual connection, 20 bits are thereby required for storage for the value of the number X, 20 bits are required for the value of the expression $X \cdot z_{na}$, and 20 bits are required for the value of the maximum counter reading established by the expression $X \cdot z_{max}$. Thus, in total, 60 bits are thus required for every virtual connection for storing these values.

In the example above, Y is set to a constant or fixed value for various binary character rates.

When, depending on the established binary character rate, the number Y has two different values, for example one value for binary character values from 2.4 kbit/s through 1 Mbit/s and another value 256 for binary character rates from 1 Mbit/s through 120 Mbit/s, then the values of the number X set forth below are obtained for the binary character rates $B_{req}$ set forth below, and the deviation err in percentage deriving therefrom is obtained.

| $B_{req}$ | X | Y | % err |
|---|---|---|---|
| 2.4 | 55954 | 1 | 0.999 |
| 16.0 | 8393 | 1 | 1.001 |
| 64.0 | 2098 | 1 | 1.013 |
| 144.0 | 933 | 1 | 0.952 |
| 1,920.0 | 179905 | 256 | 1.001 |
| 10,000.0 | 3438 | 256 | 0.994 |
| 34,368.0 | 1000 | 256 | 1.029 |
| 68,736.0 | 500 | 256 | 1.029 |
| 120,000.0 | 286 | 256 | 1.170 |

Per virtual connection, 16 bits are thereby required for storing for the value of the number X, 16 bits are required for the value of the expression $X \cdot z_{na}$, and 16 bits are required for the value of the maximum counter reading established by the expression $X \cdot z_{max}$. In addition, one bit is required for the selection of the value of the number Y. Thus, 49 bits are required for every virtual connection for storing these values.

In these two examples, the numbers X and Y are whole numbers.

In the following example, the number Y has four different values depending on the binary character rate established, whereby fractional values are also allowed for the number Y. The number Y has the value 1/64 for binary character rates from 2.4 kbit/s through 100 kbit/s, the value 1 for binary character rates from 100 kbit/s through 4 Mbit/s, the value 16 for binary character rates from 4 Mbit/s through 50 Mbit/s and the value 64 for binary character rates from 50 Mbit/s through 120 Mbit/s. The values of the number X set forth below are obtained for the binary character rates set forth below and the deviation err deriving therefrom is also obtained.

| $B_{req}$ | X | Y | % err |
|---|---|---|---|
| 2.4 | 874 | 0.016 | 1.032 |
| 16.0 | 131 | 0.016 | 1.109 |
| 64.0 | 33 | 0.016 | 0.343 |
| 144.0 | 933 | 1.000 | 0.952 |
| 1,920.0 | 70 | 1.000 | 0.916 |
| 10,000.0 | 215 | 16.000 | 0.935 |
| 34,368.0 | 63 | 16.000 | 0.227 |
| 68,736.0 | 125 | 64.000 | 1.029 |
| 120,000.0 | 72 | 64.000 | 0.468 |

For storing, 10 bits are required for the value X, 11 bits are required for the expression $X \cdot z_{na}$, and 11 bits are required for the expression $X \cdot z_{max}$. In addition, 2 bits are required for the selection of the value of the number Y. For storing these values, thus, only 34 bits are required for every virtual connection.

Assuming the value for the point in time of the arrival of the last message cell belonging to the connection requires, for example, 14 bits, then 48 bits are required in the memory of the policing unit in this latter instance, i.e. for every virtual connection, assuming a useful binary character rate of 135 Mbit/s of the transmission system.

Although modifications and changes may be suggested by those skilled in the art, it is the intention of the inventors to embody within the patent warranted hereon all changes and modifications as reasonably and properly come within the scope of their contribution to the art.

I claim:

1. A method for monitoring and limiting the binary character rate of a virtual connection in a transmission system, said transmission system comprising a plurality of input transmission lines with each of which is associated an exchange terminal unit, each exchange terminal unit including a policing unit, each policing unit comprising a memory, said method comprising the steps of:

asynchronously transmitting a plurality of message cells belonging to virtual connections of the transmission system via the input transmission lines, each message cell comprising a header portion identifying a virtual connection via which the message cell is to be transmitted and a useful data portion;

for every virtual connection, storing in the memory a set of two numbers which define the shortest allowable chronological spacing between transmission of two message cells for that virtual connection;

storing and maintaining in the memory a separate counter reading for every virtual connection;

forwarding to the policing unit the header portion for every message cell to be transmitted via the transmission system;

for a message cell to be transmitted via a given virtual connection n, calculating a current counter reading according to the relationship $$z_{na} = z_{na-1} - \frac{t - t_{ln}}{t_{dn}} + 1,$$

wherein $z_{na}$ refers to the current counter reading for the virtual connection n $z_{na-1}$ refers to the counter reading for the virtual connection n maintained in the memory before the arrival of the message cell just under consideration, t refers to the current point in time $t_{ln}$ refers to the point in time of the arrival of the immediately preceding message cell belonging to the same virtual connection n $t_{dn}$ refers to the shortest allowable chronological spacing between two successive message cells belonging to the virtual connection n under consideration and is calculated according to the relationship $t_{dn} = x_n/y_n$, wherein $x_n$ and $y_n$ are the set of two numbers stored in the memory which define the shortest allowable chronological spacing between transmission of two message cells for the virtual connection n;

given upward transgression of a defined counter reading by the current counter reading $Z_{na}$, discarding the message cell just under consideration;

given non-transgression of the defined counter reading by the current counter reading $Z_{na}$, forwarding the message cell just under consideration.

2. The method of claim 1, wherein the sets of two numbers which define the shortest allowable timings between transmission of two message cells for the virtual connections are stored as whole numbers in the memory.

3. The method of claim 2, wherein the value of at least one of the numbers of the sets of numbers stored in the memory is expressed as a base 2 number.

4. The method of claim 2, wherein the sets of numbers stored in the memory defining the shortest allowance timings are binary numbers.

5. The method of claim 2, wherein one of the numbers of each set of numbers stored in the memory defining the shortest allowable timings is the same for all such sets of numbers.

* * * * *